(12) United States Patent
Takahashi (10) Patent No.: US 11,691,579 B2
(45) Date of Patent: Jul. 4, 2023

(54) VEHICLE SHOCK ABSORBING STRUCTURE

(71) Applicant: SUBARU CORPORATION, Tokyo (JP)

(72) Inventor: Kenji Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/692,427

(22) Filed: Mar. 11, 2022

(65) Prior Publication Data

US 2022/0314911 A1    Oct. 6, 2022

(30) Foreign Application Priority Data

Mar. 30, 2021 (JP) .................... 2021-057575

(51) Int. Cl.
*B60R 19/26* (2006.01)
(52) U.S. Cl.
CPC ........ *B60R 19/26* (2013.01); *B60R 2019/262* (2013.01)
(58) Field of Classification Search
CPC .... B60R 21/34; B60R 2021/343; B60R 19/26
USPC ...................... 296/187.04, 187.09
See application file for complete search history.

(56) References Cited

U.S. PATENT DOCUMENTS 8,714,294 B2 * 5/2014 Hasegawa ............... B60R 19/18
180/274
2014/0252802 A1 * 9/2014 Lopez .................... B60R 21/34
296/187.04

FOREIGN PATENT DOCUMENTS

EP     1266818 A2 * 12/2002 ............ B60R 19/12
JP     2006-264495 A    10/2006

* cited by examiner

*Primary Examiner* — Joseph D. Pape
(74) *Attorney, Agent, or Firm* — McGinn I.P. Law Group, PLLC (57) ABSTRACT

A vehicle shock absorbing structure provided on the vehicle includes a shock absorbing member and a bracket. The shock absorbing member is disposed on a front end of the vehicle so as to extend in a vehicle width direction. The shock absorbing member includes a front end serving as a collision portion. The bracket includes a front end coupled to a rear end of the shock absorbing member. The bracket interposed between the shock absorbing member and a vehicle body. A deformation control member that extends forward and obliquely upward is provided in a coupling portion at which the bracket is coupled to the shock absorbing member. The deformation control member is more fragile than a front portion of the shock absorbing member that in front of the coupling portion and a rear portion of the bracket in rear of the coupling portion.

4 Claims, 8 Drawing Sheets

VEHICLE SHOCK ABSORBING STRUCTURE

CROSS-REFERENCE TO RELATED APPLICATIONS

The present application claims priority from Japanese Patent Application No. 2021-057575 filed on Mar. 30, 2021, the entire contents of which are hereby incorporated by reference.

BACKGROUND

The disclosure relates to a vehicle shock absorbing structure with a shock absorbing member extending in a vehicle width direction.

As a vehicle shock absorbing structure, the following structure has been proposed. That is, the structure includes a bracket of an L-shape in a front view. The bracket couples an upper portion of a front end of a resin front-end panel extending in a vehicle width direction and a radiator upper support of a vehicle body. Refer to, for example, Japanese Unexamined Patent Application Publication (JP-A) No. 2006-264495. With the shock absorbing structure described in JP-A No. 2006-264495, when a frontal collision against the collision object occurs, the bracket supports an upper portion of the collision object, thereby making it possible to reduce a degree of flexion of the upper portion relative to a lower portion of the collision object. Furthermore, when buttocks of a pedestrian fall down to a front end portion of a hood, the bracket is easily bent downward, which reduces a reaction force on thighs.

SUMMARY

An aspect of the disclosure provides a vehicle shock absorbing structure provided on a vehicle. The vehicle shock absorbing structure includes a shock absorbing member and a bracket. The shock absorbing member is disposed on a front end of the vehicle so as to extend in a vehicle width direction of the vehicle. The shock absorbing member includes a front end serving as a collision portion against a collision object. The bracket includes a front end coupled to a rear end of the shock absorbing member. The bracket is interposed between the shock absorbing member and a vehicle body of the vehicle. A deformation control member that extends forward and obliquely upward is provided in a coupling portion at which the bracket is coupled to the shock absorbing member. The deformation control member is more fragile than (i) a front portion of the shock absorbing member that is located in front of the coupling portion and (ii) a rear portion of the bracket that is located in rear of the coupling portion.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

With the shock absorbing structure described in JP-A No. 2006-264495, the bracket mainly serves as an energy absorbing member. When an input shock from a collision object acts on the energy absorbing member obliquely downward and rearward, the bracket is easily bent but a drag on the collision object becomes lower.

The disclosure has been made in view of the above circumstances. It is desirable to provide a vehicle shock absorbing structure that can provide an enough drag irrespective of an input direction of a shock from a collision object.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
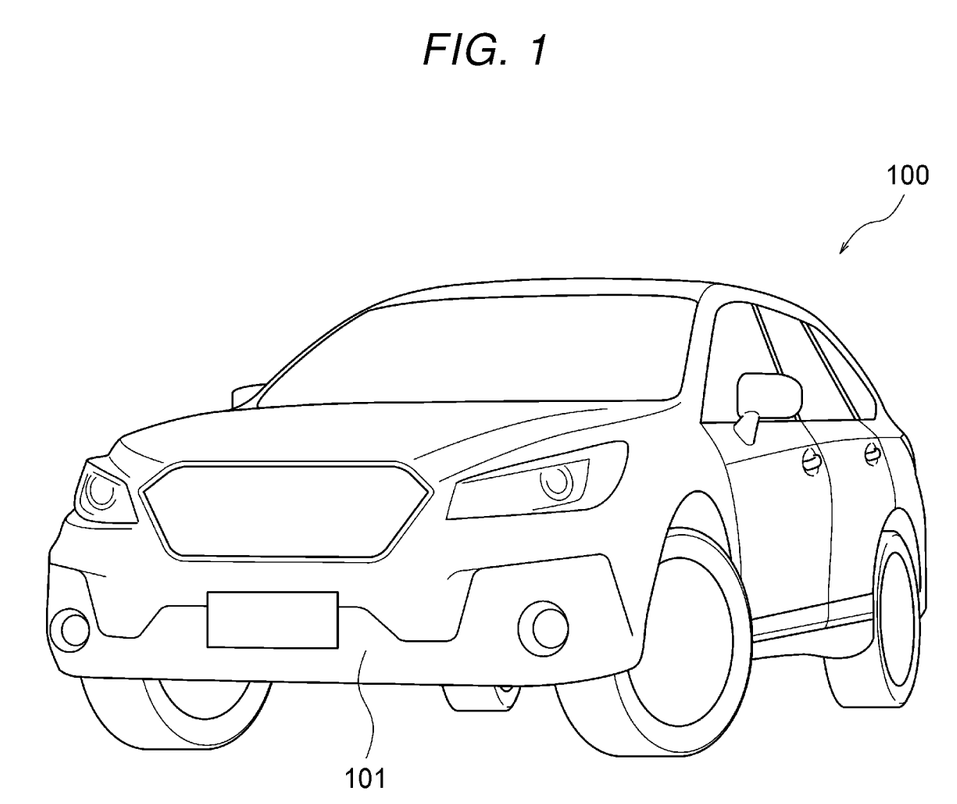
FIG. 1 is an external perspective view of a vehicle illustrating an embodiment of the disclosure.
Figure 2:
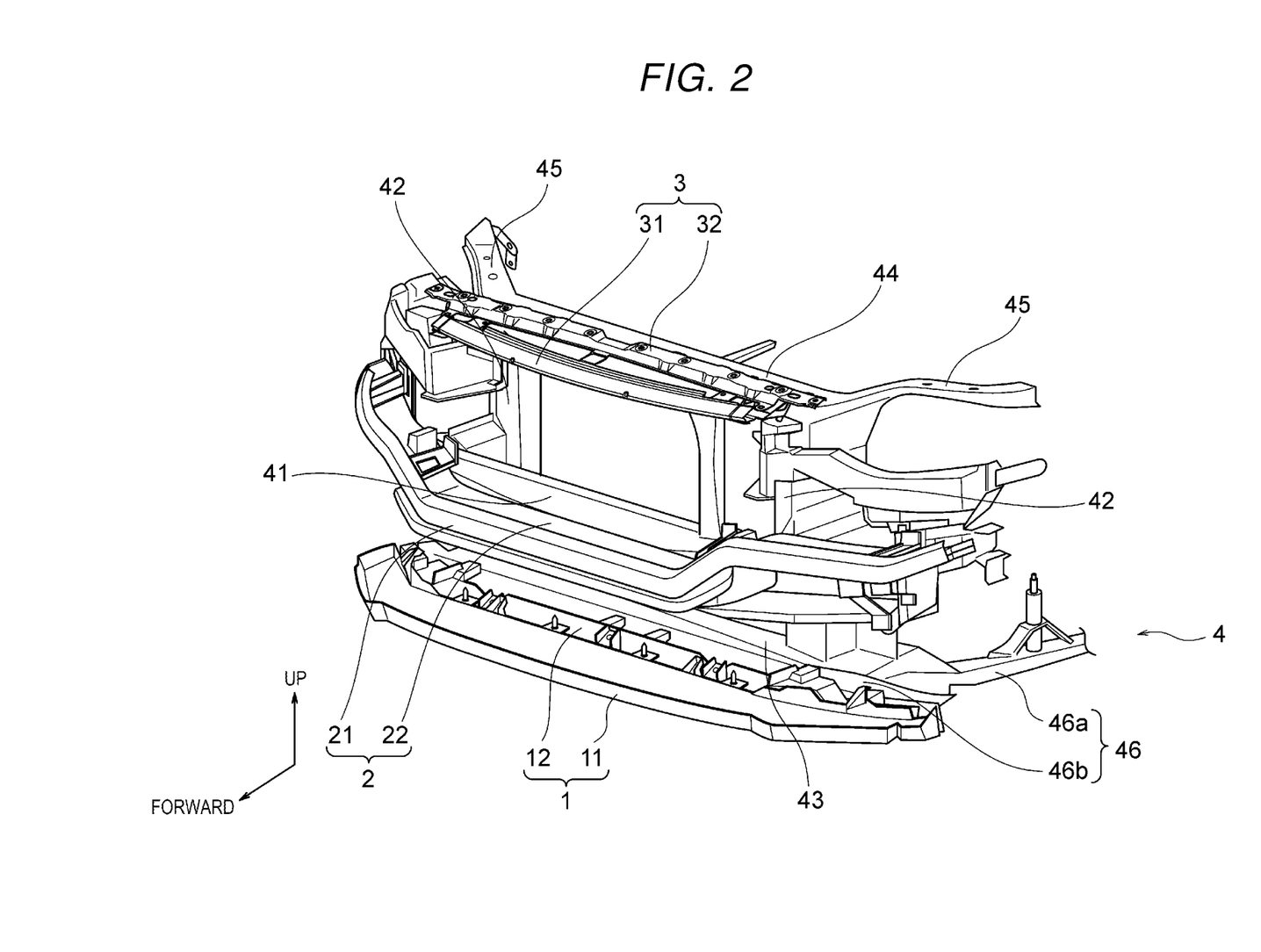
FIG. 2 is a perspective view illustrating front members of a vehicle body.
Figure 3:
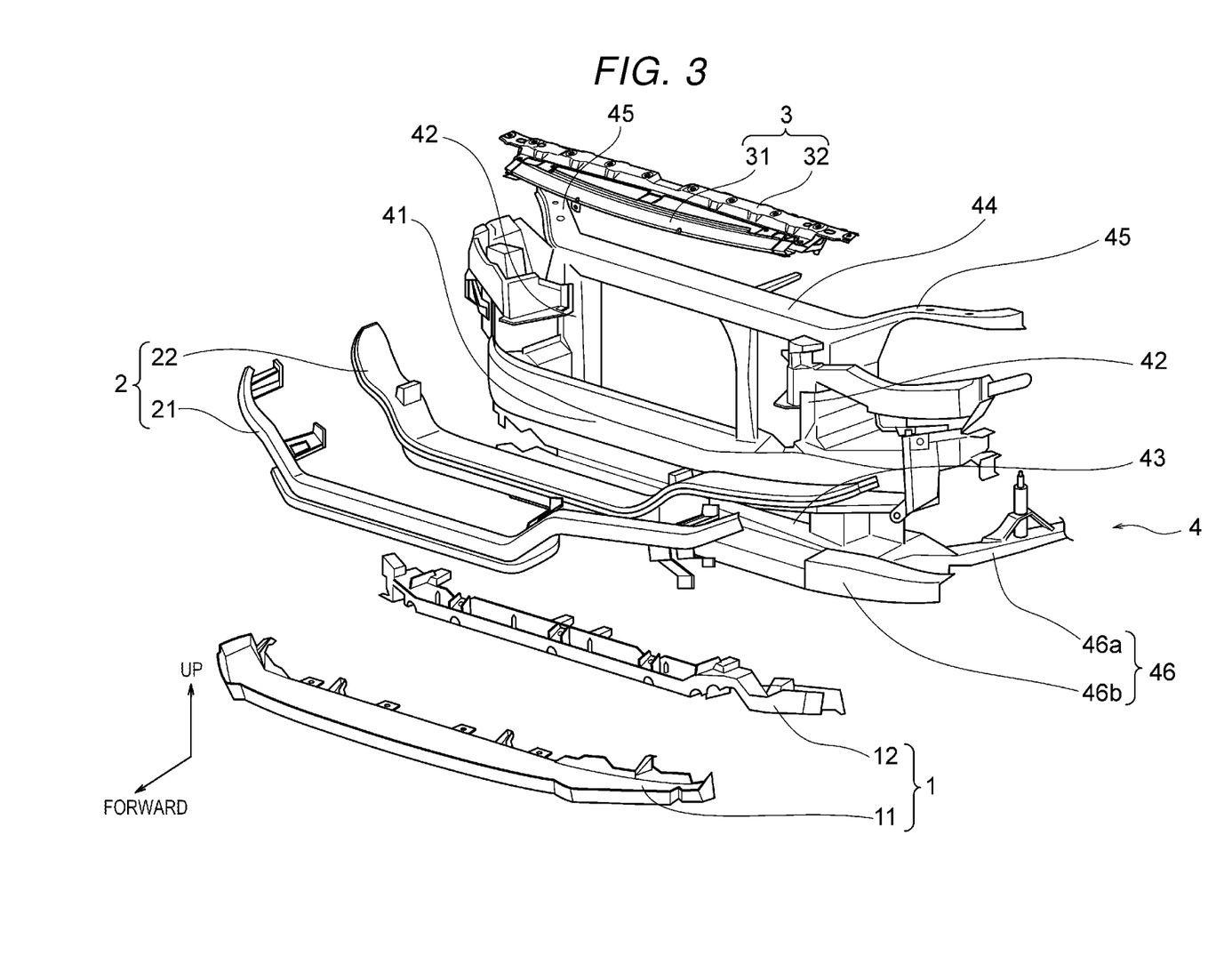
FIG. 3 is an exploded perspective view illustrating the front members of the vehicle body.
Figure 4:
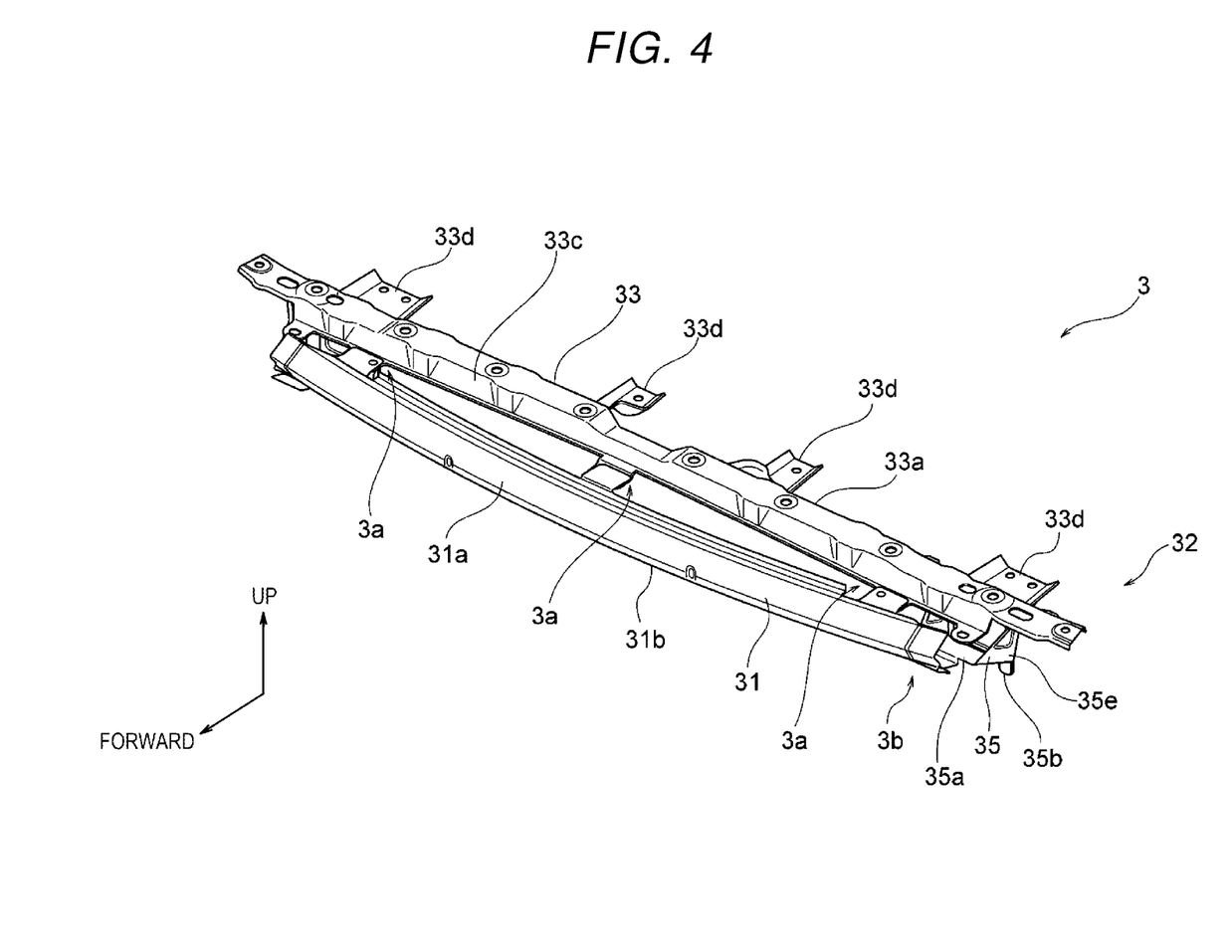
FIG. 4 is a perspective view illustrating an upper shock absorber.
Figure 5:
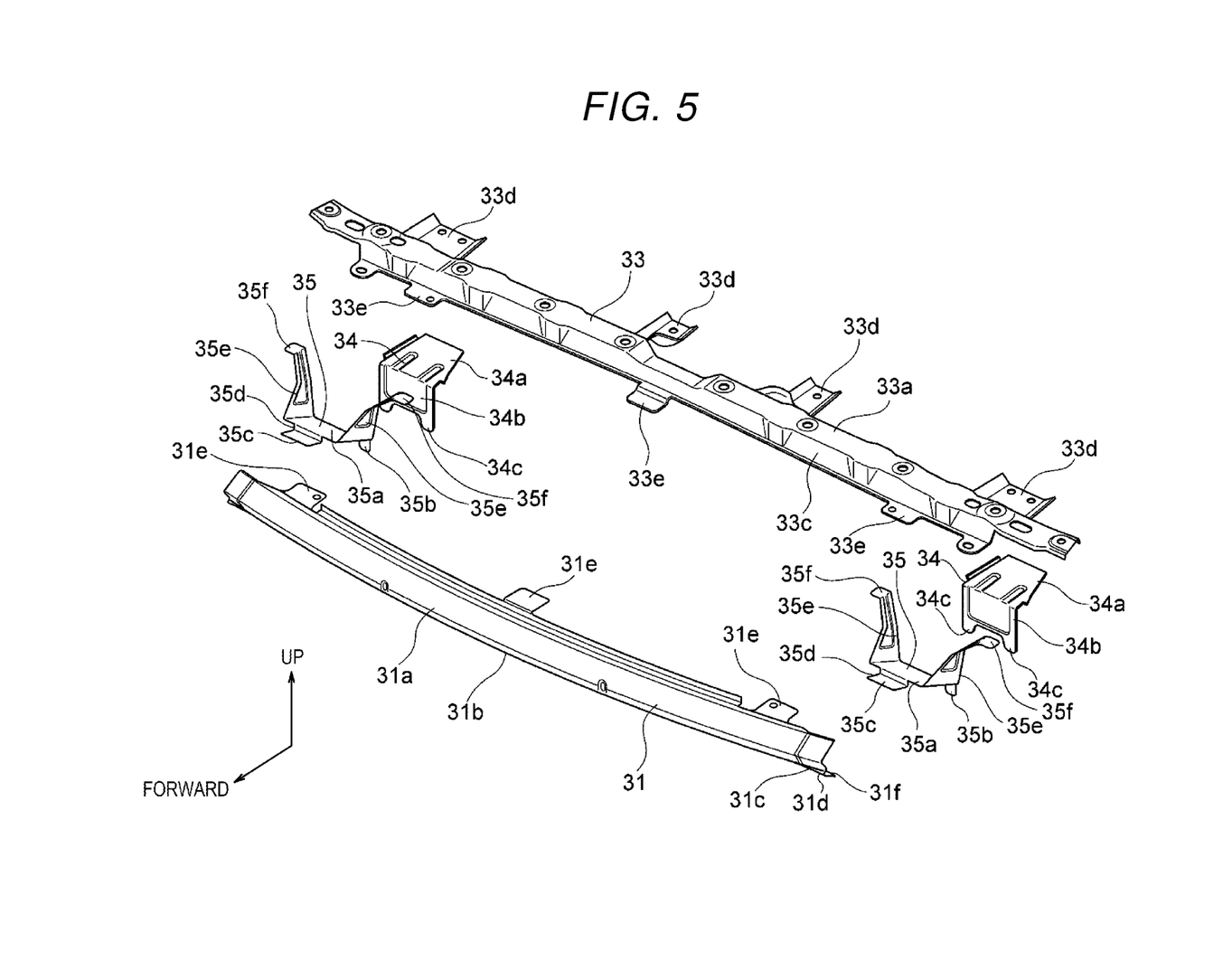
FIG. 5 is an exploded perspective view illustrating the upper shock absorber.
Figure 6:
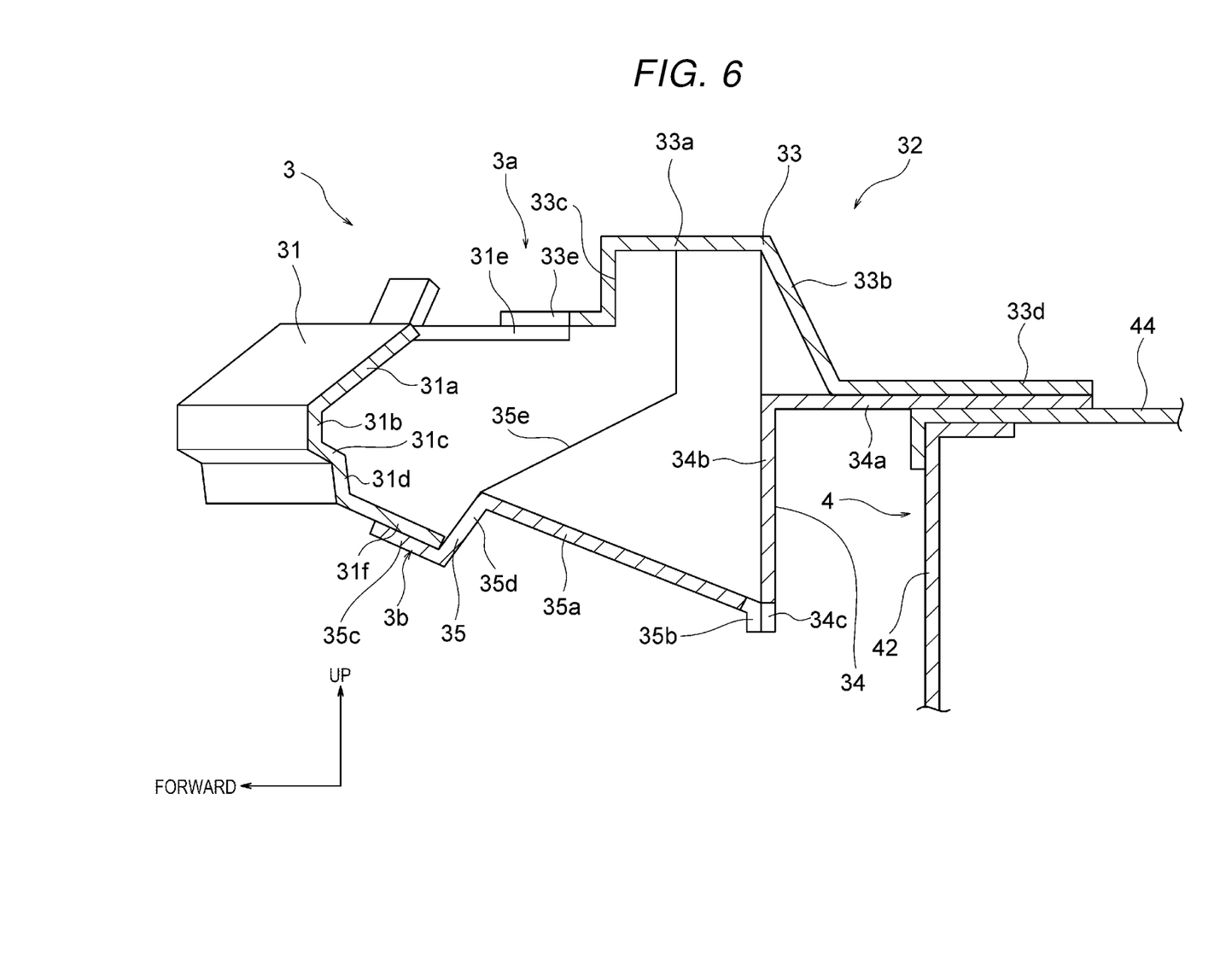
FIG. 6 is a side cross-sectional view illustrating the upper shock absorber.
Figure 7:
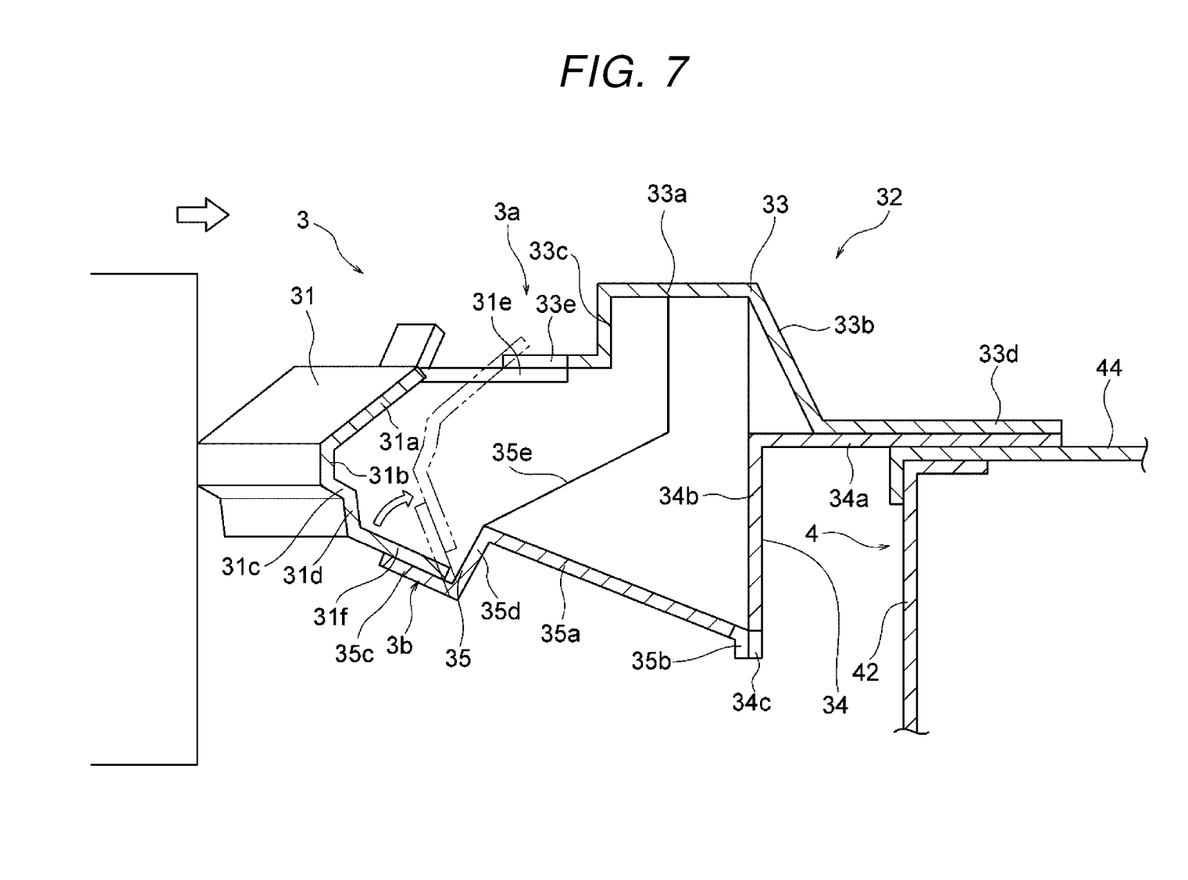
FIG. 7 illustrates a behavior of the upper shock absorber when a horizontal shock is applied to the upper shock absorber from a collision portion of a shock absorbing member.
Figure 8:
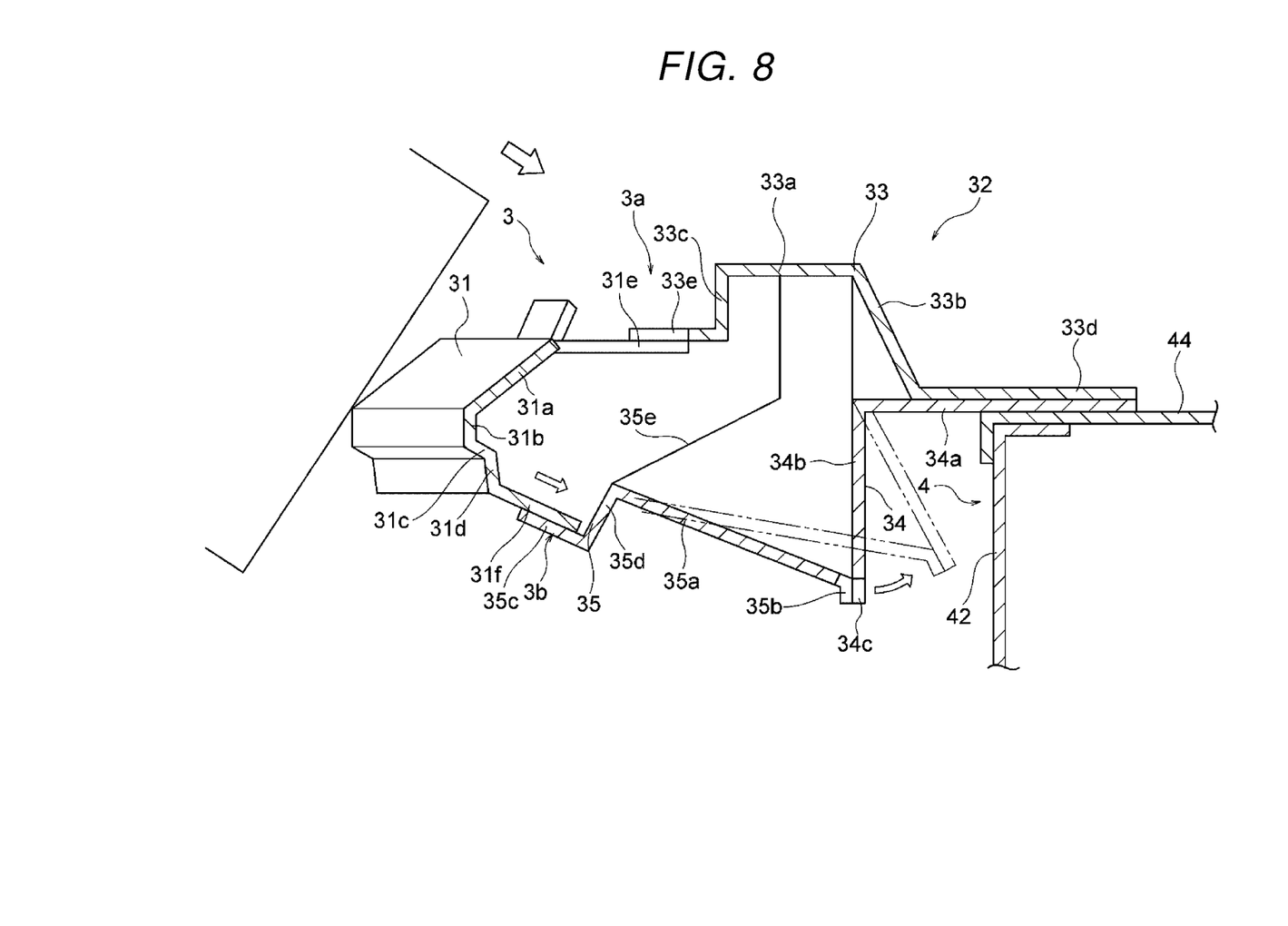
FIG. 8 illustrates a behavior of the upper shock absorber when a shock is applied obliquely downward and rearward to the upper shock absorber from the collision portion of the shock absorbing member.

FIGS. 1 to 8 illustrate the embodiment of the disclosure. FIG. 1 is an external perspective view of a vehicle according to the embodiment of the disclosure. FIG. 2 is a perspective view illustrating front members of a vehicle body. FIG. 3 is an exploded perspective view illustrating the front members of the vehicle body. FIG. 4 is a perspective view illustrating an upper shock absorber. FIG. 5 is an exploded perspective view illustrating the upper shock absorber. FIG. 6 is a side cross-sectional view illustrating the upper shock absorber. FIG. 7 illustrates a behavior of the upper shock absorber when a horizontal shock is applied to the upper shock absorber from a collision portion of a shock absorbing member. FIG. 8 illustrates a behavior of the upper shock absorber when a shock is applied downward and obliquely rearward to the upper shock absorber from the collision portion of the shock absorbing member.

As illustrated in FIG. 1, a shock absorbing structure of a vehicle 100 is provided in rear of a bumper face 101 that acts as a design face on a front end of the vehicle 100. As illustrated in FIG. 2, plural shock absorbers 1, 2, and 3 extending in a vehicle width direction are provided in rear of the bumper face 101. For the sake of description, FIG. 2 illustrates a state in which the bumper face 101 is detached from a vehicle body 4 side. In the present embodiment, the three shock absorbers, that is, a lower shock absorber 1, a central shock absorber 2, and an upper shock absorber 3 are provided. The shock absorbers 1, 2, and 3 are each secured to a predetermined location of the vehicle body 4.

As illustrated in FIG. 2, the configuration of the vehicle body 4 is such that panel members obtained by press-molding, for example, steel plates are integrated and joined to each other by spot welding or the like. The vehicle body 4 has a pair of left and right side frames (not illustrated), a bumper beam 41, a pair of left and right radiator panels 42, a radiator lower support 43, a radiator upper support 44, and a pair of left and right coupling members 45. The side frames extend in a fore-and-aft direction. The bumper beam 41 couples front ends of the side frames via brackets and extend in a vehicle width direction. The radiator panels 42 are coupled to the front ends of the side frames, respectively and extend in an up-and-down direction. The radiator lower support 43 couples lower ends of the radiator panels 42 and extend in the vehicle width direction. The radiator upper support 44 couples upper ends of the radiator panels 42 and extends in the vehicle width direction. The coupling members 45 couple end portions of the radiator upper support 44 in the vehicle width direction to a pair of left and right upper frames (not illustrated) that extend in the fore-and-aft direction, respectively. The bumper beam 41 is longer than the radiator upper support 44 to extend further outward in the vehicle width direction. A pair of left and right headlamps (not illustrated) are disposed on an outside of the radiator upper support 44 in the vehicle width direction.

The vehicle body 4 also has a sub frame 46. The sub frame 46 has a pair of left and right first members 46a and a second member 46b. The first members 46a are provided below the side frames and extend in the fore-and-aft direction. The second member 46b is coupled to front ends of the first members 46a and extends in the vehicle width direction. The second member 46b is disposed in front of the radiator lower support 43.

The lower shock absorber 1 is provided in front of the second members 46b of the sub frames 46. In the present embodiment, the lower shock absorber 1 is divided into a front member 11 and a rear member 12. The front member 11 and the rear member 12 are permanently affixed to the vehicle body 4. While a material of the lower shock absorber may be selected freely, resin, for example, may be selected. In the present embodiment, the front member 11 and the rear member 12 are made of non-foamed polypropylene.

The central shock absorber 2 is provided in front of the bumper beam 41. In the present embodiment, the central shock absorber 2 is divided into a front member 21 and a rear member 22. The front member 21 and the rear member 22 are permanently affixed to the vehicle body 4. While a material of the central shock absorber 2 may be selected freely, metal or resin, for example, may be selected. In the present embodiment, the front member 21 is made of non-foamed polypropylene, and the rear member 22 is made of foamed polypropylene.

The upper shock absorber 3 is provided in front of the radiator upper support 44. As illustrated in FIG. 4, the upper shock absorber 3 has a shock absorbing member 31 and a bracket 32. The shock absorbing member 31 has a front end. In one embodiment, the front end of the shock absorbing member 31 may serve as a "collision portion against a collision object". The bracket 32 is interposed between the shock absorbing member 31 and the vehicle body 4. While a material of the upper shock absorber 3 may be selected freely, metal, for example, may be selected. In the present embodiment, the shock absorbing member 31 and the bracket 32 are made of steel plates. As illustrated in FIGS. 4 and 5, the bracket 32 includes plural types of bracket members 33, 34, and 35. As illustrated in FIG. 5, in the present embodiment, the bracket 32 includes three types of, that is, first, second, and third bracket members 33, 34, and 35.

Overall, the first bracket member 33 extends in the vehicle width direction along the radiator upper support 44. As illustrated in FIG. 6, the first bracket member 33 has an upper wall 33a, a rear wall 33b, and a front wall 33c. The upper wall 33a extends in the fore-and-aft direction in a side view. The rear wall 33b extends downward and obliquely rearward from a rear end of the upper wall 33a in the side view. The front wall 33c extends downward from a front end of the upper wall 33a in the side view. As illustrated in FIG. 5, the first bracket member 33 has vehicle body coupling portions 33d disposed at predetermined locations in the vehicle width direction. The vehicle body coupling portions 33d extend rearward from a lower end of the rear wall 33b. The vehicle body coupling portions 33d are coupled to an upper surface of the radiator upper support 44. In the present embodiment, the vehicle body coupling portions 33d are provided at four locations in total, that is, two locations in a center region in the vehicle width direction and two locations in an outside region in the vehicle width direction. The vehicle body coupling portions 33d in the outside region in the vehicle width direction are provided in coupling portions where the radiator upper support 44 is coupled to the respective radiator panels 42. The first bracket member 33 also has front coupling portions 33e provided at predetermined locations in the vehicle width direction. The front coupling portions 33e extend forward from a lower end of the front wall 33c. The front coupling portions 33e are coupled to the shock absorbing member 31. In the present embodiment, the front coupling portions 33e are provided at three locations in total, that is, one location in the center region in the vehicle width direction and two locations in the outside region in the vehicle width direction.

As illustrated in FIG. 5, a pair of left and right second bracket members 34 are provided corresponding to the vehicle body coupling portions 33d of the first bracket member 33 in the outside region in the vehicle width direction. Each of the second bracket members 34 has an upper wall 34a and a front wall 34b. The upper wall 34a extends in the fore-and-aft direction in the side view. The front wall 34b extends downward from a front end of the upper wall 34a in the side view. As illustrated in FIG. 6, a rear end of each upper wall 34a is put between the vehicle body coupling portion 33d of the first bracket member 33 and the radiator upper support 44, and a front end of each upper wall 34a protrudes forward from the radiator upper support 44. The rear end of the upper wall 34a and the vehicle body coupling portion 33d of the first bracket member 33 are secured to the radiator upper support 44 by a bolt or the like. It is noted that the vehicle body coupling portions 33d of the first bracket member 33 in the center region in the vehicle width direction are secured to the radiator upper support 44 by the bolt or the like without association with the second bracket members 34. The front walls 34b extend in the up-and-down direction and are apart from the radiator panels 42 in the fore-and-aft direction. A lower end of the front wall 34b is a free end that is not coupled to the vehicle body 4. The lower end of the front wall 34b is coupled to a third bracket member 35. As illustrated in FIG. 5, in the present embodiment, the second bracket member 34 has lower coupling portions 34c at both ends, in the vehicle width direction, of the lower end of the front wall 34b. The lower coupling portions 34c extend downward to be coupled to the third bracket member 35.

The pair of left and right third bracket members 35 are provided corresponding to the second bracket members 34. As illustrated in FIG. 6, each of the third bracket members 35 has a main wall 35a that extends forward and obliquely upward in the side view. A rear end of the main wall 35a is coupled to the second bracket member 34. A front end of the main wall 35a is coupled to the shock absorbing member 31. As illustrated in FIG. 5, in the present embodiment, the third bracket member 35 has lower coupling portions 35b at both ends, in the vehicle width direction, of the rear end of the main wall 35a. The lower coupling portions 35b extend downward to be coupled to the second bracket member 34. The lower coupling portions 34c of the second bracket member 34 and the lower coupling portions 35b of the third bracket member 35 are bonded to each other by welding or the like in a superimposed state. Furthermore, the third bracket member 35 has a front coupling portion 35c in a center region of the front end of the main wall 35a in the vehicle width direction. The front coupling portion 35c extends forward and obliquely upward to be coupled to the shock absorbing member 31. In the present embodiment, the front coupling portion 35c is provided at the main wall 35a via an inclined portion 35d that extends forward and obliquely downward. Moreover, as illustrated in FIG. 5, the third bracket member 35 has a pair of left and right side walls 35e and flanges 35f. The side walls 35e extend upward from both ends of the main wall 35a in the vehicle width direction. The flanges 35f extend laterally outward from upper ends of the side walls 35e. The flanges 35f are bonded to a lower surface of the upper wall 33a of the first bracket member 33 by welding or the like.

Overall, the shock absorbing member 31 extends in the vehicle width direction in front of the first bracket member 33. The shock absorbing member 31 is curved so that a center of the shock absorbing member 31 in the vehicle width direction protrudes further forward than both ends of the shock absorbing member 31 in the vehicle width direction. As illustrated in FIG. 6, the shock absorbing member 31 has a main wall 31a, a front wall 31b, an inclined wall 31c, and a lower side wall 31d. The main wall 31a extends forward and obliquely downward in the side view. The front wall 31b extends downward from a front end of the main wall 31a in the side view. The inclined wall 31c extends rearward and obliquely downward from a lower end of the front wall 31b in the side view. The lower side wall 31d extends downward from a rear end of the inclined wall 31c in the side view.

The shock absorbing member 31 has upper coupling portions 31e provided at predetermined locations in the vehicle width direction. The upper coupling portions 31e extend rearward from a rear end of the main wall 31a. The upper coupling portions 31e are coupled to the first bracket member 33. In the present embodiment, the upper coupling portions 31e are provided at three locations in total, that is, one location in a center region in the vehicle width direction and two locations in an outside region in the vehicle width direction to correspond to the front coupling portions 33e of the first bracket member 33. Each of the front coupling portions 33e of the first bracket member 33 and the respective one of the upper coupling portions 31e of the shock absorbing member 31 are bonded to each other by welding or the like or secured to each other by a bolt or the like. In the present embodiment, the upper coupling portion 31e of the shock absorbing member 31 and the front coupling portion 33e of the first bracket member 33 constitute an upper deformation control member 3a that extends in the fore-and-aft direction. The upper deformation control member 3a is more fragile than (i) the main wall 31a of the shock absorbing member 31 located in front of the upper deformation control member 3a and (ii) the front wall 33c of the first bracket member 33 located in rear of the upper deformation control member 3a.

The shock absorbing member 31 has lower coupling portions 31f provided at predetermined locations in the vehicle width direction. The lower coupling portions 31f extend rearward and obliquely downward from a lower end of the lower side wall 31d. The lower coupling portions 31f are coupled to the third bracket member 35. In the present embodiment, the lower coupling portions 31f are provided at two locations in the outside region in the vehicle width direction, corresponding to the front coupling portions 35c of the third bracket member 35. The front coupling portion 35c of each of the third bracket members 35 and the respective one of the lower coupling portions 31f of the shock absorbing member 31 are bonded to each other by welding or the like in a superimposed state. In the present embodiment, (i) the lower coupling portion 31f of the shock absorbing member 31, (ii) the front coupling portion 35c of the third bracket member 35, and (iii) the inclined portion 35d of the third bracket member 35 constitute a lower deformation control member 3b that extends rearward and obliquely downward. The lower deformation control member 3b is more fragile than (i) the lower side wall 31d of the shock absorbing member 31 located in front of the lower deformation control member 3b and (ii) the main wall 35a of the third bracket member 35 located in rear of the lower deformation control member 3b.

With the shock absorbing structure configured as described above, a collision object that invades rearward at a relatively elevated position comes into contact with the front end of the shock absorbing member 31 of the upper shock absorber 3, and energy of the collision object is absorbed by a deformation of the shock absorbing member 31. A behavior of the upper shock absorber 3 when an input shock from the collision object acts horizontally and rearward and a behavior of the upper shock absorber 3 when an input shock from the collision object acts rearward and obliquely downward will now be described.

As illustrated in FIG. 7, when the input shock from the collision object acts horizontally and rearward, a force in a bending direction acts on the lower deformation control member 3b. A front end of the lower deformation control member 3b moves upward and obliquely rearward with a rear end of the lower deformation control member 3b serving as a bending point, and the lower deformation control member 3b is bent. In the present embodiment, a rear end of the front coupling portion 35c of the third bracket member 35 that extends rearward and obliquely downward is continuous with a front end of the inclined portion 35d that extends forward and obliquely downward. The lower deformation control member 3b is, therefore, easily bent at a meeting point between the front coupling portion 35c and the inclined portion 35d of the third bracket member 35. At this time, a lower end of the second bracket member 34 located in rear of the lower deformation control member 3b hardly deforms. On the other hand, a force in a compression direction acts on the upper deformation control member 3a, and the upper deformation control member 3a generates a relatively high drag. As a result, the shock absorbing member 31 and the first bracket member 33 are mainly crushed in the fore-and-aft direction. For example, when the vehicle 100 collides head-on against an obstacle and a horizontal input shock from the obstacle acts on the shock absorbing member 31, the upper deformation control member 3a is capable of generating an enough drag.

As illustrated in FIG. 8, when an input shock from the collision object acts rearward and obliquely downward, then a force in a compression direction acts on the lower deformation control member 3b, and the lower deformation control member 3b generates a relatively high drag. In the present embodiment, the lower end of the second bracket member 34 that constitutes a lower end of the bracket 32 is not coupled to the vehicle body 4. In an initial period of collision, therefore, the lower end of the second bracket member 34 is allowed to move rearward. As a result, it is possible to reduce an abrupt increase in an acceleration of the collision object caused by an excessive drag generated in the shock absorbing member 31 and the bracket 32. After the lower end of the second bracket member 34 moves rearward and abuts on the radiator panels 42, the lower end of the bracket 32 is supported by the radiator panels 42. As a result, a relatively high drag is generated in the shock absorbing member 31 and the bracket 32. On the other hand, a force in the bending direction acts on the upper deformation control member 3a. A front end of the upper deformation control member 3a moves downward and obliquely rearward with a rear end of the upper deformation control member 3a serving as a bending point, and the upper deformation control member 3a is bent. As a result, the shock absorbing member 31, the second bracket members 34, and the third bracket members 35 are mainly crushed in the fore-and-aft direction. In the present embodiment, the shock absorbing member 31 of the upper shock absorber 3 is located in front of the radiator upper support 44. When an input shock from thighs of a pedestrian acts on the shock absorbing member 31 rearward and obliquely downward during a collision against the pedestrian, it is possible to generate an enough drag while reducing an abrupt increase in the acceleration of the thighs.

In this way, the shock absorbing structure according to the present embodiment is capable of changing deformation modes of the deformation control members 3a and 3b depending on an input direction of the shock from the collision object, and generating a drag in response to the input direction. At this time, it is possible to absorb energy of the collision object mainly by the deformation of the shock absorbing member 31 irrespective of the input direction of the shock from the collision object. It is also possible to generate the enough drag in each input direction.

In the embodiment described above, the shock absorbing structure has the three shock absorbers. It is noted that the number of shock absorbers may be changed freely. Furthermore, the disclosure is applied to the upper shock absorber disposed on the radiator upper support. Alternatively, the disclosure is applicable to either the central shock absorber disposed on the bumper beam or the lower shock absorber disposed on the radiator lower support.

Moreover, in the embodiment, the deformation control members are provided at the two locations, that is, upper and lower locations. If at least the deformation control member that extends forward and obliquely upward is provided, it is possible to generate an enough drag when an input shock acts on the front end of the shock absorbing member rearward and obliquely downward. Furthermore, the deformation control member includes the coupling portions of the shock absorbing member and the bracket. Alternatively, a deformation control member may be formed, for example, by separately providing a coupling member that couples the shock absorbing member to the bracket between the shock absorbing member and the bracket. The specific configuration of the deformation control member may be freely changed.

Moreover, in the embodiment, the lower end of the bracket is apart from the vehicle body. Alternatively, the lower end of the bracket may be coupled to the vehicle body. In this alternative, when the input shock from the collision object acts on the shock absorbing member rearward and obliquely downward, it is possible to generate a relatively high drag from the initial period of collision.

With the vehicle shock absorbing structure according to the embodiment, the collision object that invades rearward comes into contact with the front end of the shock absorbing member, and it is possible to absorb energy of the collision object by the deformation of the shock absorbing member. When the input shock from the collision object acts horizontally and rearward, the force in the bending direction acts on the lower deformation control member. The front end of the lower deformation control member moves upward and obliquely rearward with the rear end of the lower deformation control member serving as a bending point, and the lower deformation control member is bent. On the other hand, when the input shock from the collision object acts rearward and obliquely downward, the force in the compression direction acts on the lower deformation control member. The lower deformation control member generates a higher drag than that generated when the input shock from the collision object acts horizontally and rearward.

While the embodiment of the disclosure has been described so far, the embodiment described above is not intended to limit the disclosure set forth in the claims. It is also noted that all combinations of features described in the embodiment may not be essential.

The invention claimed is:

1. A vehicle shock absorbing structure provided on a vehicle, the vehicle shock absorbing structure comprising:
   a shock absorbing member disposed on a front end of the vehicle so as to extend in a vehicle width direction of the vehicle, the shock absorbing member comprising a front end serving as a collision portion against a collision object; and
   a bracket comprising a front end coupled to a rear end of the shock absorbing member, the bracket being interposed between the shock absorbing member and a vehicle body of the vehicle, wherein
   a deformation control member that extends forward and obliquely upward is provided in a coupling portion at which the bracket is coupled to the shock absorbing member, and
   the deformation control member is more fragile than (i) a front portion of the shock absorbing member that is located in front of the coupling portion and (ii) a rear portion of the bracket that is located in rear of the coupling portion.

2. The vehicle shock absorbing structure according to claim 1, wherein
   the bracket has a predetermined size in an up-and-down direction of the vehicle,
   an upper end side portion of the bracket is coupled to the vehicle body, and
   a lower end of the bracket is apart from the vehicle body.

3. The vehicle shock absorbing structure according to claim 2, wherein
   the vehicle body comprises a pair of left and right radiator panels that extend in the up-and-down direction, and the lower end of the bracket is disposed in front of the radiator panels.

4. The vehicle shock absorbing structure according to claim 3, wherein
the vehicle body further comprises a radiator upper support that couples upper ends of the radiator panels, the radiator upper support extending in the vehicle width direction, and
the upper end side portion of the bracket is coupled to the radiator upper support.

\* \* \* \* \*